US009756122B2

(12) United States Patent
Wexler et al.

(10) Patent No.: US 9,756,122 B2
(45) Date of Patent: Sep. 5, 2017

(54) USING HIERARCHICAL RESERVOIR SAMPLING TO COMPUTE PERCENTILES AT SCALE

(71) Applicant: Yahoo! Inc., Sunnyvale, CA (US)

(72) Inventors: Mike Wexler, Mountain View, CA (US); Robert Ames, Sunnyvale, CA (US); Ian Flint, Sunnyvale, CA (US)

(73) Assignee: Yahoo Holdings, Inc., Sunnyvale, CA (US)

( * ) Notice: Subject to any disclaimer, the term of this patent is extended or adjusted under 35 U.S.C. 154(b) by 364 days.

(21) Appl. No.: 14/664,043

(22) Filed: Mar. 20, 2015

(65) Prior Publication Data

US 2016/0277490 A1    Sep. 22, 2016

(51) Int. Cl.
*G06F 15/173* (2006.01)
*H04L 29/08* (2006.01)
*H04L 12/26* (2006.01)
*H04L 12/24* (2006.01)

(52) U.S. Cl.
CPC ........ *H04L 67/1029* (2013.01); *H04L 41/044* (2013.01); *H04L 43/022* (2013.01); *H04L 43/0876* (2013.01)

(58) Field of Classification Search
CPC . H04L 67/1029; H04L 41/044; H04L 43/022; H04L 43/0876
See application file for complete search history.

(56) References Cited

U.S. PATENT DOCUMENTS

| 7,095,850 B1* | 8/2006 | McGrew ................ H04L 9/065 380/37 |
| 8,819,038 B1 | 8/2014 | Rhodes et al. |
| 2003/0028631 A1 | 2/2003 | Rhodes |
| 2003/0033403 A1 | 2/2003 | Rhodes |
| 2008/0027947 A1* | 1/2008 | Pritchett ........... G06F 17/30887 |

OTHER PUBLICATIONS

Buragohain, Chiranjeeb et al., "Quantiles on Streams," Encyclopedia of Database Systems, 2009, ISBN 978-0-387-35544-3, pp. 2235-2240.

* cited by examiner

*Primary Examiner* — Krisna Lim
(74) *Attorney, Agent, or Firm* — Weaver Austin Villeneuve & Sampson LLP

(57) ABSTRACT

In one embodiment, in a hierarchy of nodes, a master node having two or more child nodes obtains from the two or more child nodes two or more sets of data samples or summaries associated therewith, the two or more sets of data samples being representative of traffic processed via two or more sets of servers corresponding to the two or more child nodes, wherein a size of each of the two or more sets of data samples is proportional to an allocation of traffic among the two or more sets of servers corresponding to the two or more child nodes. Each of the two or more sets of data samples is obtained from a different one of the two or more child nodes and represents traffic processed by a corresponding one of the two or more sets of servers. The master node combines the two or more sets of data samples or summaries associated therewith such that a combined set of data is generated. The master node ascertains a numerical value from the combined set of data.

20 Claims, 6 Drawing Sheets

Obtain by a master node in a hierarchy of nodes, from each child node of the master node, a set of data samples or summary associated therewith, the set of data samples being representative of traffic processed via a set of servers corresponding to the child node, wherein a size of the set of data samples is proportional to a distribution of total traffic among the set of servers and other sets of servers corresponding to other child nodes of the master node
202

↓

Generate, at the master node, a combined set of data from the set of samples or summary obtained from each child node of the master node
204

↓

Ascertain, at the master node, a numerical value from the combined set of data
206

USING HIERARCHICAL RESERVOIR SAMPLING TO COMPUTE PERCENTILES AT SCALE

BACKGROUND OF THE INVENTION

The disclosed embodiments relate generally to computer-implemented methods and apparatus for performing hierarchical sampling and computing of numerical values such as percentiles.

A percentile is a measure used in statistics indicating the value below which a given percentage of data points in a group of data points fall. For example, the $20^{th}$ percentile is the value below which 20 percent of the data points may be found.

Typically, to identify an nth percentile of a set of data values, the set of data values are sorted and the nth percentile is then identified. Unfortunately, sorting is an extremely time-consuming process. Therefore, as the set of data values increases in size, the time it takes to identify the nth percentile also increases.

SUMMARY OF THE INVENTION

In one embodiment, a master node in a hierarchy of nodes may obtain, from each child node of the master node, a set of data samples or summary associated therewith, the set of data samples being representative of traffic processed via a set of servers corresponding to the child node, where a size of the set of data samples is proportional to a distribution of total traffic among the set of servers and other sets of servers corresponding to other child nodes of the master node. The master node may generate a combined set of data from the set of samples or summary obtained from each child node of the master node. The master node may ascertain a numerical value from the combined set of data.

In another embodiment, in a hierarchy of nodes, a master node having two or more child nodes may obtain, from the two or more child nodes, two or more sets of data samples or summaries associated therewith, the two or more sets of data samples being representative of traffic processed via two or more sets of servers corresponding to the two or more child nodes, wherein a size of each of the two or more sets of data samples is proportional to an allocation of traffic among the two or more sets of servers corresponding to the two or more child nodes. Each of the two or more sets of data samples may be obtained from a different one of the two or more child nodes and may represent traffic processed by a corresponding one of the two or more sets of servers. The master node may combine the two or more sets of data samples or summaries associated therewith such that a combined set of data is generated. The master node may ascertain a numerical value from the combined set of data.

In another embodiment, the invention pertains to a device comprising a processor and a memory. The processor and memory are configured to perform one or more of the above described method operations. In another embodiment, the invention pertains to a computer readable storage medium having computer program instructions stored thereon that are arranged to perform one or more of the above described method operations.

These and other features and advantages of the present invention will be presented in more detail in the following specification of the invention and the accompanying figures which illustrate by way of example the principles of the invention.

DETAILED DESCRIPTION OF THE SPECIFIC EMBODIMENTS

Figure 1:
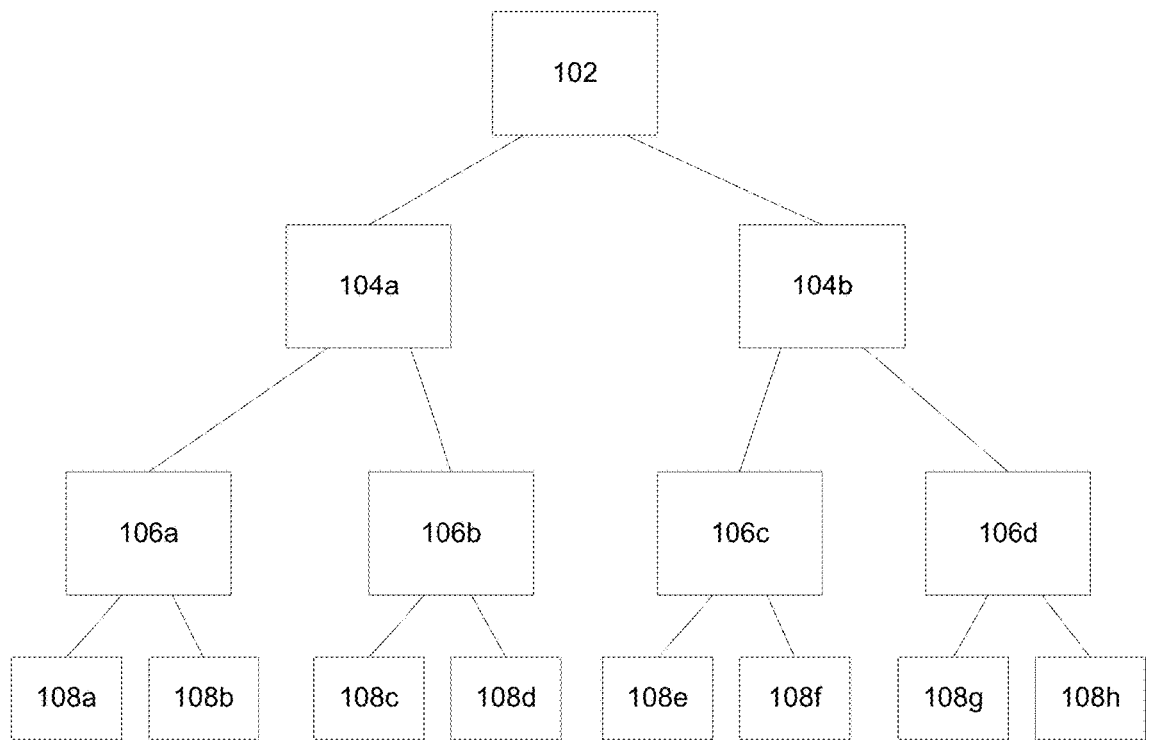
FIG. 1 is a diagram illustrating an example hierarchy of nodes in which embodiments of the invention may be implemented.

Reference will now be made in detail to specific embodiments of the disclosure. Examples of these embodiments are illustrated in the accompanying drawings. While the disclosure will be described in conjunction with these specific embodiments, it will be understood that it is not intended to limit the disclosure to these embodiments. On the contrary, it is intended to cover alternatives, modifications, and equivalents as may be included within the spirit and scope of the disclosure as defined by the appended claims. In the following description, numerous specific details are set forth in order to provide a thorough understanding of the disclosure. The disclosed embodiments may be practiced without some or all of these specific details. In other instances, well known process operations have not been described in detail in order not to unnecessarily obscure the disclosure. The Detailed Description is not intended as an extensive or detailed discussion of known concepts, and as such, details that are known generally to those of ordinary skill in the relevant art may have been omitted or may be handled in summary fashion Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

When monitoring large systems, calculating numerical values such as percentiles for data such as response times can be difficult and time-consuming. Typically, data is transmitted from devices in the system to a single central device so that the device can determine numerical values such as an n-th percentile from the data. Since raw data is transmitted from each of the devices, the process also consumes a significant amount of memory.

One common method of transmitting data is to send a histogram, where the data is split at various predetermined levels (e.g., 0-50 ms, 50-100 ms, 100-250 ms, 250-500 ms, >500 ms). However, this method is disadvantageous since the boundaries are predetermined. For example, all events may occur during the same time period (e.g., 0-50 ms). As a result, it is difficult to process the data with a predictable amount of granularity.

In accordance with various embodiments, numerical values such as percentiles may be determined based upon samples of data or summaries associated therewith rather than all of the data. Since the amount of data upon which a numerical value is determined is reduced via a sampling and/or summarization process, numerical values may be determined more efficiently and using less memory.

As will be described in further detail below, samples of data or summaries associated therewith may be collected and forwarded by multiple nodes in a hierarchy of nodes. Numerical values such as percentiles may then be determined from the forwarded samples or corresponding summaries. The disclosed embodiments may be implemented via software and/or hardware.

FIG. 1 is a diagram illustrating a hierarchy of nodes in which various embodiments may be implemented. The hierarchy may include two or more levels of nodes. In accordance with various embodiments, samples of data or summaries associated therewith may be passed from nodes in a lower level in the hierarchy to a master node in an upper level in the hierarchy, enabling the master node in the upper level to ascertain a numerical value from the samples of data or summaries it has received. For example, the master node in the upper level may sort samples that have been received to obtain an n-th percentile. As another example, the master node in the upper level may determine an average value from summaries it has received. A summary may include a sum of multiple data values and an indication of the number of data values that have been added to generate the sum.

In accordance with various embodiments, samples of data that are propagated from lower levels in the hierarchy to upper levels of the hierarchy may include raw data (e.g., data values) that has been gathered at the lower levels of the hierarchy. In some embodiments, summaries of data gathered at the lower levels of the hierarchy may be generated and propagated to upper levels via the hierarchy. For example, a summary may correspond to a segment of time during which the data values were collected.

In one embodiment, each of the nodes may correspond to a segment of time. For example, the nodes in the lower level in the hierarchy may represent samples of data that correspond to 5 minute segments, the nodes in the next upper level of the hierarchy may represent samples of data that correspond to 1 hour segments, the nodes in the next upper level of the hierarchy may represent samples of data that correspond to 24 hour segments, etc. In this example, the hierarchy includes four levels of nodes. More particularly, a first level of the hierarchy, shown as a top level of the hierarchy, includes a single node 102. A second level of the hierarchy includes nodes 104a and 104b. A third level of the hierarchy includes nodes 106a, 106b, 106c, and 106d. A fourth level of the hierarchy, shown as a bottom level of the hierarchy, includes nodes 108a, 108b, 108c, 108d, 108e, 108f, 108g, and 108h.

Each of the nodes may represent, for example, a set of one or more processors, a set of one or more computers, a set of one or more servers (e.g., web servers), or one or more data centers. At least some of the nodes may include web servers or may be in direct communication with web servers. In some embodiments, at least some of the nodes 108a, 108b, 108c, 108d, 108e, 108f, 108g, and 108h at the bottom level of the hierarchy may operate as servers (e.g., web servers) or may be directly connected to servers. Nodes at lower levels of the hierarchy may be responsible for collecting data samples or summaries associated therewith and forwarding the data samples or associated summaries so that a set of data samples or summaries is eventually received at the top level of the hierarchy. Thus, data samples or one or more associated summaries collected by a given node may correspond to events (e.g., web events) processed by a corresponding set of one or more servers (e.g., web servers) from which those data samples were originally obtained. The set of servers corresponding to the node may include the node (e.g., where the node is a server). Alternatively, the set of servers corresponding to the node may be communicatively coupled to the node, either directly or indirectly (e.g., via a child node of the node).

The nodes in the hierarchy may be located in the same geographical location. Alternatively, the nodes in the hierarchy may be located in different geographic locations.

The nodes may operate in the same manner as other nodes in the hierarchy or, alternatively, the nodes may operate in a different manner from other nodes in the hierarchy. For example, the nodes may implement the same or different operating systems or hardware. As another example, the nodes may be supported by the same carrier or different carriers.

Functionality may also be distributed among various nodes in the hierarchy. In accordance with various embodiments, at least some of the nodes may function as sources of content. More particularly, a plurality of sets of content may be stored such that they are distributed across at least a subset of the nodes in the hierarchy (e.g., at the bottom level of the hierarchy). For example, the sets of content may be distributed across subject matter categories, types of media content (e.g., videos, photographs, news articles), and/or language in which the content is provided. As yet another example, functionality among nodes in the hierarchy may be distributed across time segments (e.g., where corresponding web servers are located in different time zones).

A node having one or more child nodes may operate as a master node to obtain data samples or one or more summaries from each of the child nodes. In one embodiment, each child node may perform sampling of data representative of the traffic processed (e.g., transmitted and/or received) via the child node or a corresponding set of servers (e.g., web servers) such that a set of data samples is obtained in association with the corresponding child node. In another embodiment, each child node may generate one or more summaries from a set of data samples or a set of summaries associated therewith. Generally, traffic may include one or more packets (e.g., data packets and/or control packets). For example, the traffic may include data traffic and/or web traffic. Data traffic may also be referred to as network traffic, which may be transmitted among devices connected via one or more networks. Web traffic may include packets or data that are transmitted and/or received by web servers. Stated another way, web traffic may include data that is sent and/or received by client devices used by visitors of a web site associated with the web servers.

In this example, node 102 operates as a master node for its child nodes 104a, 104b. Similarly, node 104a operates as a master node for its child nodes 106a, 106b, while node 104b operates as a master node for its child nodes 106c, 106d. Node 106a operates as a master node for its child nodes 108a, 108b; node 106b operates as a master node for its child nodes 108c, 108d; node 106c operates as a master node for its child nodes 108e, 108f; and node 106d operates as a master node for its child nodes 108g, 108h.

In accordance with various embodiments, nodes 108a, 108b, 108c, 108d, 108e, 108f, 108g, 108h may gather data pertaining to events such as web events and randomly select samples from the data to transmit to their respective master nodes. Nodes 106a, 106b, 106c, 106d may receive the data samples from their respective child nodes, and may similarly randomly select samples from the received data samples to be transmitted to their respective master nodes 104a, 104b. Similarly, nodes 104a, 104b may randomly select samples from the data samples received from their respective child nodes, and transmit the selected data samples to their master node 102.

The data samples or summaries associated therewith may be received by a master node in response to a request transmitted by the master node to the child nodes. Alternatively, the data samples or associated summaries may be received automatically by a master node from its child nodes. More particularly, the data samples or summaries may be automatically transmitted periodically from each of the child nodes to its master node.

The data samples or summaries associated therewith obtained from a child node may be representative of traffic (e.g., data traffic or web traffic) that has been processed (e.g., transmitted and/or received) via the child node or by a set of servers (e.g., web servers) associated with the child node. Each child node or its corresponding set of servers (e.g., web servers) may process a corresponding amount of traffic (e.g., data traffic or web traffic) that is a fraction of the total amount of traffic processed by all of the child nodes of the master node. To accurately ascertain a numerical value such as the n-th percentile from the combined set of data, the number of data samples obtained from each child node (or the number of data samples used to generate a summary obtained from each child node) may be proportional to the fraction of the total amount of traffic processed by that child node (or corresponding set of servers). In other words, the number of data samples obtained from each child node (or used by each child node to generate a corresponding summary) may correspond directly to the portion of the total traffic (e.g., data traffic or web traffic) allocated to that child node (or corresponding servers).

In accordance with one embodiment, the child nodes transmit data samples to the master node. Since the child nodes of the master node will generally be unaware of the traffic distributed to other child nodes of the master node, the child nodes may be unable to independently determine the number of data samples to provide to its master node. As a result, the child nodes may provide a greater number of data samples than will be used by the master node to determine a numerical value such as an n-th percentile. Alternatively, the child nodes may provide the number of data samples requested by the master node. Thus, in its determination of the n-th percentile, the master node may use all of the data samples it receives from a given child node or only a subset of the data samples it receives from that child node.

The data samples provided by a child node to its master node or used by that child node to generate a summary may be randomly sampled by the child node according to a random sampling method. For example, the random sampling method may include a sketch-based sampling algorithm or reservoir sampling. More particularly, a sample of k data items may be randomly sampled from a set S containing n data items. The child node may store each of the n data items or only a subset of the n data items that includes the k data items that have been sampled in a memory of the child node or a memory coupled to the child node. Each of the n data items may be representative of traffic (e.g., data traffic or web traffic) processed (e.g., transmitted and/or received) via the child node or a set of servers corresponding to the child node. For example, the n data items may be received by the child node, directly or indirectly (e.g., via its own child nodes), from the set of servers. As another example, the n data items may be generated by the child node as a result of processing (e.g., transmitting and/or receiving) traffic (e.g., data traffic or web traffic). The processing of traffic by the child node or a corresponding set of servers may include analysis of the traffic such that the n data items are obtained. Such analysis may include extracting information from packets received and/or transmitted by the child node or server. The data samples may be sorted by the child node prior to providing the data samples or associated summary to the master node. A sampling rate at which data is sampled may be varied based upon the rate that data is received by the child node.

For each of its child nodes, the master node may ascertain the specific number of data samples it desires from that child node for determination of the n-th percentile for data samples received from the child nodes. Therefore, for each of its child nodes, the master node may request a specific number of data samples from a child node or obtain the specific number of data samples from a larger number of data samples received from the child node. The master node may similarly request that a child node summarize a specific number of data samples prior to providing the summary to the master node.

To determine the specific number of data samples desired from each of its child nodes, the master node may first determine the distribution of the total amount of traffic among its child nodes. More particularly, the master node may receive a numerical value from each of the child nodes that indicates an amount of traffic (e.g., data traffic or web traffic) processed by that child node or a corresponding set of servers during a period of time. For example, the numerical value received from a child node may indicate a total amount of data received or processed by that child node during the period of time. The total amount of data may be directly proportional to the amount of traffic processed by the child node or its corresponding set of servers during the period of time. The master node may then sum the numerical values received from its child nodes to determine a total amount of traffic allocated to the child nodes. The master node may then ascertain, from the numerical values and the total amount of traffic, the distribution of the total amount of traffic across the child nodes. In other words, the master node may determine a fraction or percentage of the total amount of traffic that was processed during the period of time by each of its child nodes or corresponding servers.

For example, master node 102 may receive a first numerical value, 1000, from child node 104*a* and a second numerical value, 2000, from child node 104*b*. By summing these values, the master node 102 may determine the total amount of traffic (or corresponding data), 3000, processed by its child nodes or corresponding servers. Thus, the master node 102 may determine that child node 104*a* processes one-third of the traffic (or corresponding data) and child node 104*b* processes two-thirds of the traffic (or corresponding data). Thus, the master node 102 may obtain or request specific numbers of data samples (or associated summaries) from its child nodes that are in proportion to the distribution of traffic among the child nodes or corresponding servers. In this example, the master node 102 may obtain or request a first number of data samples (e.g., 100) from child node 104*a* and a second number of data samples that is twice the first number of data samples (e.g., 200) from child node 104*b*. More particularly, the master node 102 may request 100 data samples from child node 104*a* and may request 200 data samples from child node 104*b*. Alternatively, the master node 102 may randomly select 100 data samples from a larger set of data samples received from child node 104*a* and randomly select 200 data samples from a larger set of data samples received from child node 104*b*.

The master node may combine the data samples or summaries associated therewith obtained from each of its child nodes to generate a combined set of data. The master node may then ascertain a numerical value from the combined set of data. For example, the master node may sort the data samples to ascertain an n-th percentile from the combined set of data.

A child node may also operate as a master node for its own child nodes. Thus, a master node at lower levels of the hierarchy may similarly collect data samples or associated summaries from its own child nodes to determine a numerical value such as a sum or n-th percentile. However, in some instances, a master node at lower levels of the hierarchy may simply forward data samples and an indication of a distribution of traffic among its child nodes to a superior master node (e.g., a master node of the master node) without determining a numerical value such as an n-th percentile. For example, nodes 104*a* and 104*b* may forward data samples from their respective child nodes along with an indication of a distribution of traffic (e.g., data traffic or web traffic) among their respective child nodes or corresponding sets of servers (e.g., web servers).

Data samples may represent various events (e.g., web events) occurring at the sets of servers (e.g., web servers). In accordance with various embodiments, a web event may include the serving of content by a web server. For example, the content may include a web page, an advertisement, audio, or video. Thus, a data sample may include information pertaining to the web event. More particularly, a data sample may include demographic information (e.g., age or gender) pertaining to a user receiving the content and/or information pertaining to an account of the user receiving the content. In addition, the data sample may include characteristics of the quality of the web event. Such characteristics may include a response time, a serving time associated with the serving of content and/or a size of the content. In addition, the data sample may indicate an amount of money transacted in association with the web event.

In accordance with various embodiments, the hierarchy may be associated with a web site such as a business or social networking web site. The nodes (e.g., servers) in the hierarchy may enable the web site to provide a variety of services to its users. For example, the nodes may include servers such as web server(s), search server(s), email server(s), and/or content server(s).

A content server may store content for presentation to users. For example, a content server may store web pages available on the Internet or data gathered via the Internet. As another example, a content server may be an "ad server" that stores online advertisements for presentation to users. "Ad serving" refers to methods used to place online advertisements on web sites, in applications, or other places where users are more likely to see them, such as during an online session.

Service providers have rapidly expanded into many areas that allow users to interact with various resources and other users in a multitude of ways. For example, users may store and share photographs and video through a dedicated photo sharing web property. In another example, users may obtain and share news on a dedicated news related web property.

In accordance with various embodiments, a plurality of web properties may be accessed via a web portal. Each web property may include a plurality of web pages. Example web properties include Mail, News, Sports, Finance, Weather, Autos, Homes, Dating, Jobs, Shopping, Parenting, Health, Style, Beauty, Food, Movies, Travel, Answers, Careers, Celebrity, Fantasy Baseball, Fantasy Football, Fantasy Sports, Flickr, Games, Groups, Horoscopes, Local, Maps, Messenger, Music, Search, Small Business, Tech, and TV.

Clients may access services provided via various nodes in the hierarchy via a network. More particularly, the clients may access a web service provided via a web server, a search service provided via a search server, or an email service provided via an email server. For example, the clients may search for content by submitting a request to a search server. As another example, the clients may view web pages of the web site. More particularly, the clients may access web pages of a web property via a web portal associated with the web server. As yet another example, the clients may send or receive emails via an email server.

Similarly, the nodes in the hierarchy may communicate with one another via a network. The network may take any suitable form, such as a wide area network or Internet and/or one or more local area networks (LAN's). The network may include any suitable number and type of devices, e.g., routers and switches, for forwarding search or web object requests from each client to the search or web application and search or web results back to the requesting clients.

The disclosed embodiments may also be practiced in a wide variety of network environments including, for example, TCP/IP-based networks, telecommunications networks, wireless networks, etc. In addition, computer program instructions with which embodiments of the invention may be implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

Figure 2A:
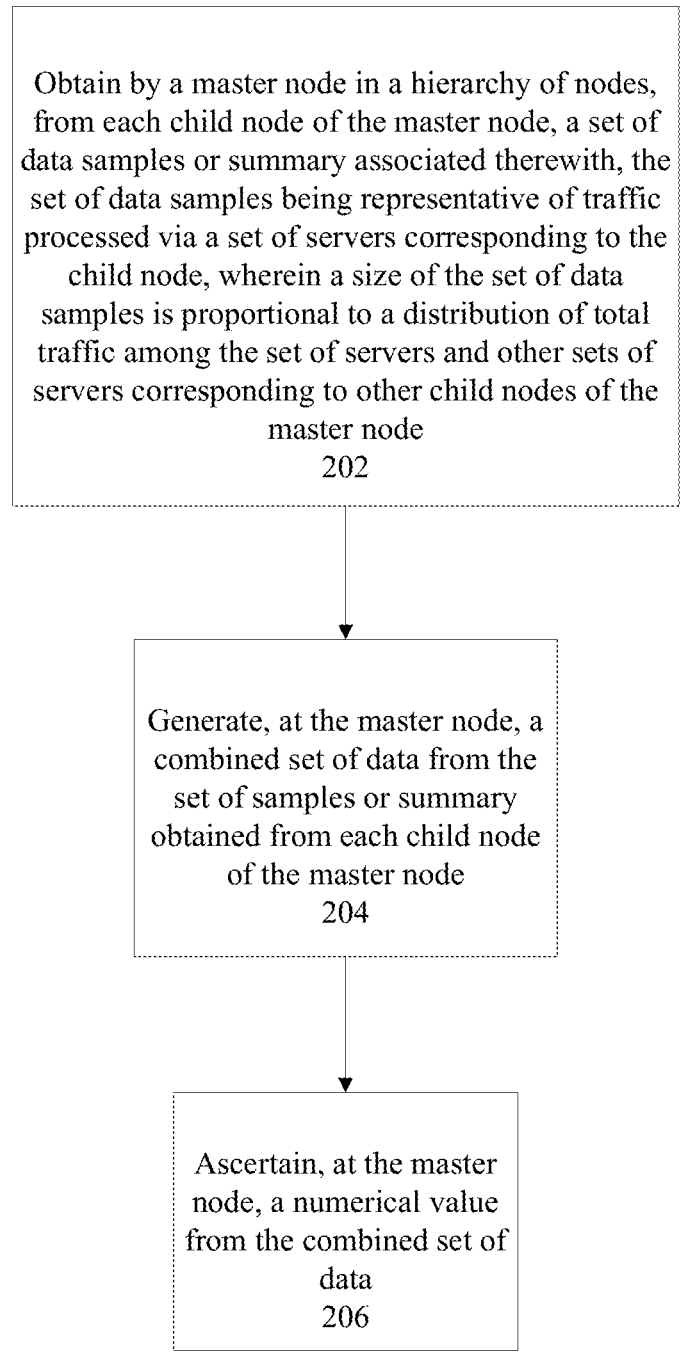
FIG. 2A is a process flow diagram illustrating an example method of performing hierarchical sampling to compute percentiles in accordance with various embodiments.

FIG. 2A is a process flow diagram illustrating an example method of performing sampling of data to ascertain percentiles in accordance with various embodiments. A master node in a hierarchy of nodes may obtain, from each child node of the master node, a set of data samples or summary associated therewith, the set of data samples being representative of traffic processed via a set of servers corresponding to the child node at 202. A size of the set of data samples may be proportional to a distribution of total traffic among the set of servers and other sets of servers corresponding to other child nodes of the master node. The size of the set of data samples may include a number of data values in the set of data samples. The master node may generate a combined set of data from the set of samples or summary obtained from each child node of the master node at 204. The master node may ascertain a numerical value from the combined set of data at 206. For example, the master node may ascertain an N-th percentile, an average, or a sum from the combined set of data.

In the following example, it is assumed that the master node has two or more child nodes. However, in some instances, it is possible that a master node may have a single child node. For example, the master node may have two child nodes where one of the child nodes is offline or has experienced a hardware failure.

Figure 2B:
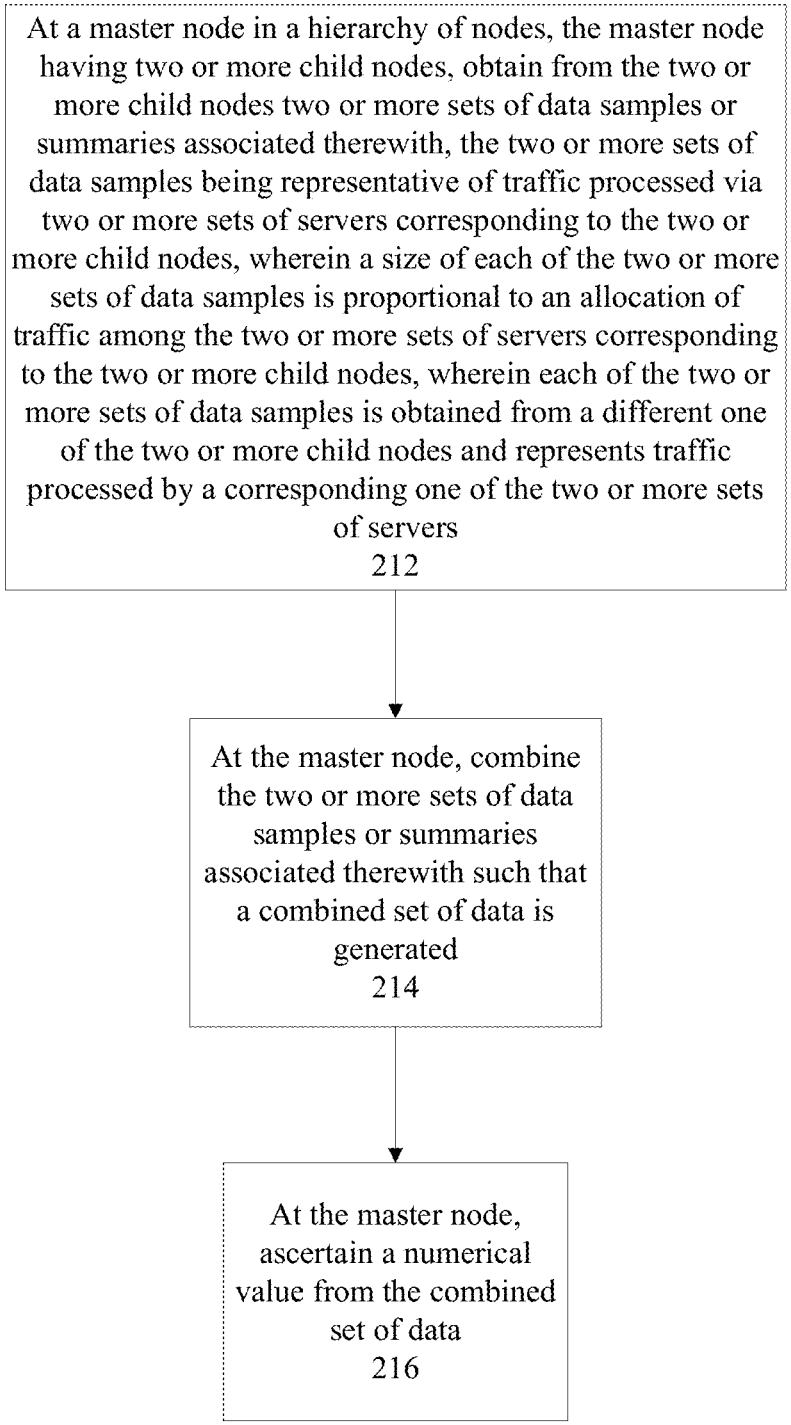
FIG. 2B is a process flow diagram illustrating another example method of performing hierarchical sampling to compute percentiles in accordance with various embodiments.
Figure 3:
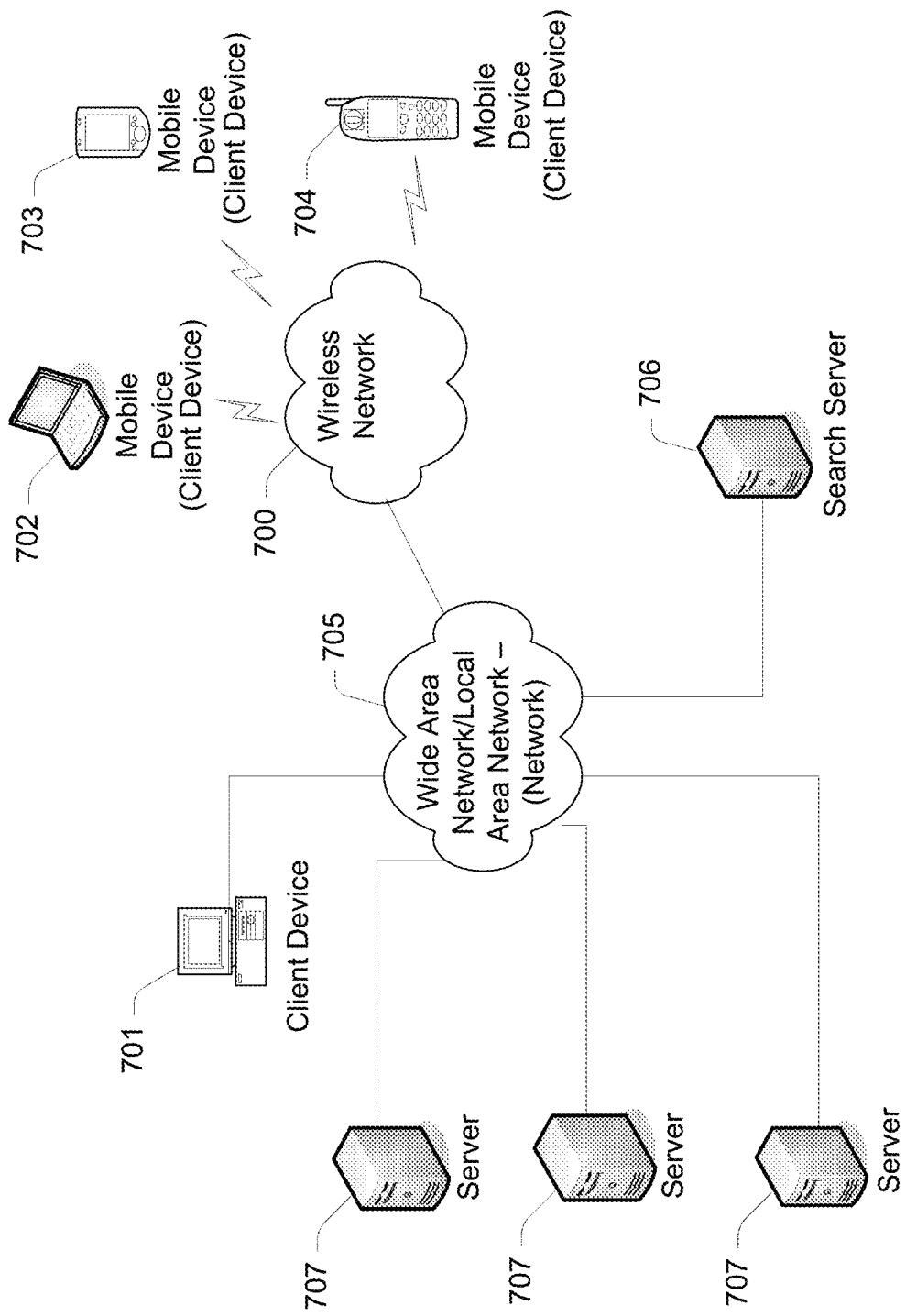
FIG. 3 is a schematic diagram illustrating an example embodiment of a network in which various embodiments may be implemented.

FIG. 2B is a process flow diagram illustrating another example method of performing sampling of data to ascertain percentiles in accordance with various embodiments. A 212, in a hierarchy of nodes, a master node having two or more child nodes obtains from the two or more child nodes two or more sets of samples of data or summaries associated therewith, the two or more sets of data samples being representative of traffic (e.g., data traffic or web traffic) processed via two or more sets of servers (e.g., web servers) corresponding to the two or more child nodes. A size of each of the two or more sets of data samples may be proportional to an allocation of traffic among the two or more sets of servers corresponding to the two or more child nodes. In this manner, the sets of data samples may be weighted according to the distribution of traffic. Thus, each of the two or more sets of samples of data may be obtained from a different one of the two or more child nodes and may represent traffic processed (e.g., transmitted and/or received) by a corresponding one of the two or more sets of servers.

In accordance with one embodiment, the master node may transmit a request to the two or more child nodes for data samples (or associated summaries) according to the allocation of the traffic among the two or more sets of servers corresponding to the two or more child nodes. More particularly, the master node may transmit a separate request to each of the two or more child nodes. Alternatively, the master node may transmit a group request to an Internet Protocol (IP) address associated with the two or more child nodes. In response to the request(s), the master node may receive the two or more sets of data samples or summaries associated therewith from the two or more child nodes. The request(s) sent by the master node to the two or more child nodes may indicate the number of data samples the master node wishes to receive from each of its child nodes.

In accordance with another embodiment, the master node may obtain the desired number of data samples from a larger number of samples automatically transmitted by the child nodes to the master node. For example, the child nodes may periodically transmit data samples to the master node without receiving a request from the master node. In other words, the master node may randomly select a subset of the larger number of samples so that it has the desired number of samples from a given child node.

Regardless of whether data samples are requested or received automatically by the master node, the master node may determine the number of data samples it wishes to obtain from each of its child nodes. More particularly, the master node may obtain, from each of its child nodes, a number of data samples that are available from that child node. In addition, the master node may ascertain the allocation of traffic among the two or more sets of servers corresponding to the two or more child nodes so that it may ascertain the numbers of data samples (e.g., from the numbers of available data samples) that would be proportional to the allocation of traffic.

In accordance with various embodiments, the master node may obtain, from the two or more child nodes, two or more total data counts representative of an amount of traffic processed (e.g., transmitted and/or received) via the two or more sets of servers corresponding to the two or more child nodes. More particularly, each of the two or more total data counts may be obtained from a different one of the two or more child nodes, where each data count indicates the amount of traffic processed (e.g., transmitted and/or received) via the corresponding set of servers corresponding to that child node. The master node may ascertain a total amount of traffic transmitted via the two or more sets of servers corresponding to the two or more child nodes based, at least in part, upon the two or more total data counts. For example, the master node may sum the two or more total data counts to ascertain the total amount of traffic. The master node may then ascertain the allocation of the traffic among the two or more sets of servers corresponding to the two or more child nodes based, at least in part, upon the two or more total data counts. More particularly, the master node may ascertain the fraction or ratio of the total amount of traffic processed (e.g., transmitted and/or received) by each of its child nodes (or corresponding set of servers) so that it may determine the number of data samples it wishes to obtain from each of its child nodes (e.g., from the samples that are available from the child nodes).

For example, nodes 108a, 108b, 108c and 108d might have corresponding total data counts representing total numbers 1 million, 2 million, 3 million and 4 million events, respectively. The nodes 108a, 108b, 108c, and 108d may provide their total data counts representing the total number of events to their corresponding master node. More particularly, node 106a may be informed by node 108a that it (and/or corresponding server(s)) has processed 1 million events, and node 106a may be informed by node 108b that it (and/or corresponding server(s)) has processed 2 million events. Similarly, node 106b may be informed by node 108c that it (and/or corresponding server(s)) has processed 3 million events, and node 106b may be informed by node 108d that it (and/or corresponding server(s)) has processed 4 million events. Thus, node 106a might take 333 samples from 108a and 667 samples from 108b (according to a ratio 1:2), while node 106b might take 429 samples from 108c and 574 samples from 108d (according to a ratio 3:4). As a result, node 104a may find that there are 1000 samples available from node 106a, representing 3 million events and 1000 samples available from node 106*b*, representing 7 million events. Therefore, node 104*a* might request 300 samples from node 106*a* and 700 samples from node 106*b*, ensuring that the samples of 106*a* and 106*b* proportionally represent all the traffic processed by the child nodes.

Once obtained, the master node may combine the two or more sets of samples of data or associated summaries at 214 such that a combined set of data is generated. The master node may ascertain a numerical value from the combined set of data at 216. For example, the numerical value may include a sum, an average, or an N-th percentile. More particularly, to ascertain an N-th percentile, the master node may sort the combined set of data in ascending or descending order so that it may identify the N-th percentile of the combined set of data. For example, the N-th percentile of response times may indicate that web page requests are served with a response time of 100 milliseconds.

In some embodiments, the child nodes of the master node may be located at a particular location or be associated with a particular carrier. In addition, the child nodes may operate as sources of content for a particular type of media content, subject matter category of content, or language in which content is provided. Thus, the numerical value (e.g., N-th percentile) may correspond to a particular location, time period, carrier, type of media content, subject matter category of content, or language in which content is provided.

The master node may operate as a child node to provide the combined set of data and an indicator of the total amount of traffic (e.g., data traffic or web traffic) to its own master node, which may be referred to as a superior master node. The combined set of data may include data values that are sorted prior to transmission to the superior master node. In addition, the master node may provide the numerical value (e.g., N-th percentile) corresponding to its segment of the traffic to the superior master node at the upper level of the hierarchy. Thus, a superior master node may receive an N-th percentile from each of its child nodes. Alternatively, the superior master node may determine the N-th percentile associated with each of its child nodes based, at least in part, upon the set of data it receives from each of its corresponding child nodes.

The superior master node may choose to send a notification or modify operations of at least one web server of a set of web servers corresponding to any of its child nodes based, at least in part, upon the numerical value (e.g., N-th percentile) received from or associated with each of its child nodes. More particularly, where the N-th percentile of any of its child nodes is below (or above) a desired threshold amount, it may be desirable to take an action to remedy a perceived inadequacy. For example, the sets of data may include data samples representing serving times experienced by clients receiving data from sets of servers (e.g., web servers) corresponding to the child nodes. Thus, the number of web events processed by a set of servers (e.g., web servers) may be reduced to improve the serving times experienced by clients receiving content from the set of servers.

Network

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Content Distribution Network

A distributed system may include a content distribution network. A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

Peer-to-Peer Network

A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Wireless Network

A wireless network may couple client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Internet Protocol

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

The Internet refers to a decentralized global network of networks. The Internet includes LANs, WANs, wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

Network Architecture

Figure 4:
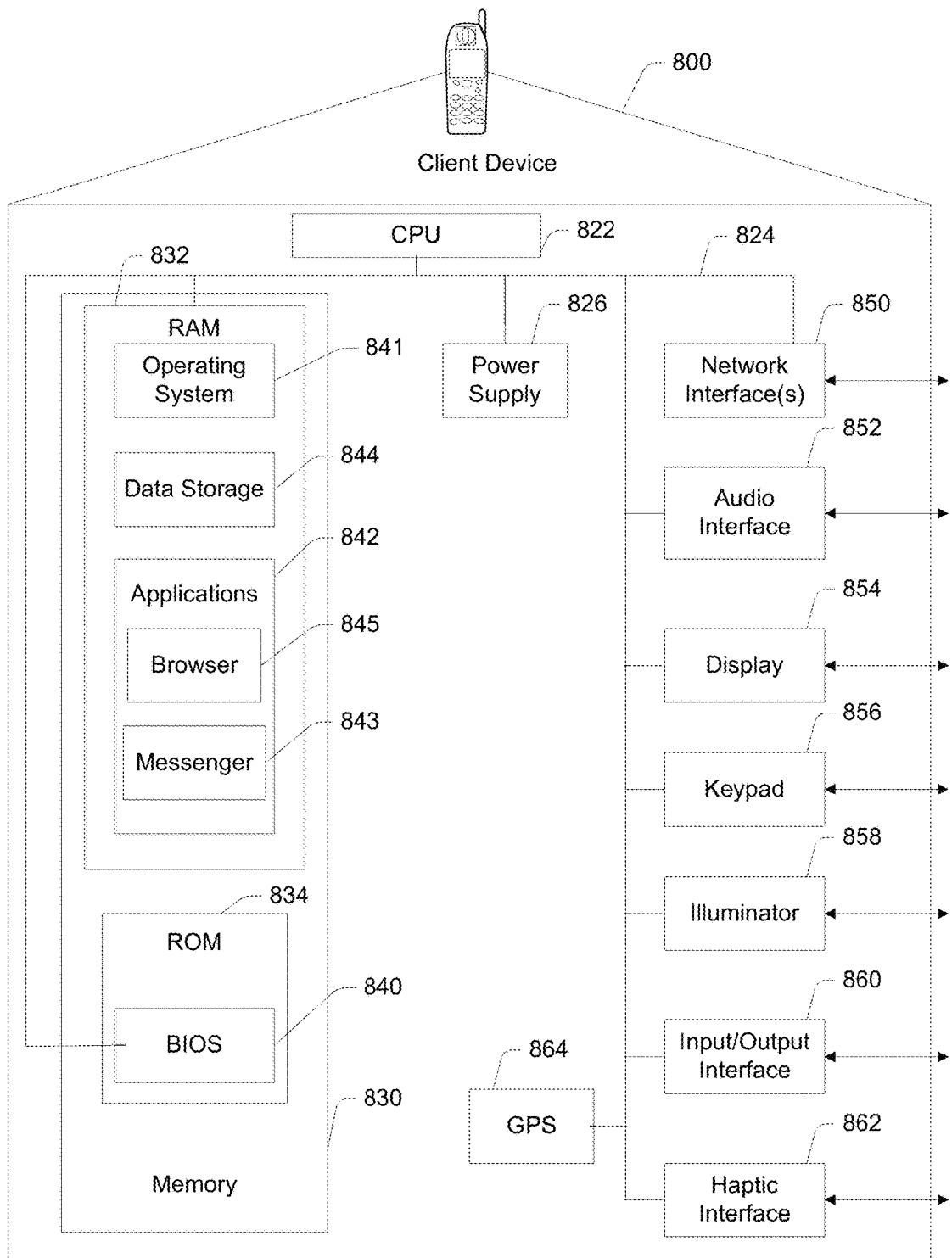
FIG. 4 is a schematic diagram illustrating an example client device in which various embodiments may be implemented.

The disclosed embodiments may be implemented in any of a wide variety of computing contexts. FIG. 4 is a schematic diagram illustrating an example embodiment of a network. Other embodiments that may vary, for example, in terms of arrangement or in terms of type of components, are also intended to be included within claimed subject matter. Implementations are contemplated in which users interact with a diverse network environment. As shown, FIG. 4, for example, includes a variety of networks, such as a LAN/WAN 705 and wireless network 700, a variety of devices, such as client devices 701-704, and a variety of servers such as content server(s) 707 and search server 706. The servers may also include an ad server (not shown). As shown in this example, the client devices 701-704 may include one or more mobile devices 702, 703, 704. Client device(s) 701-704 may be implemented, for example, via any type of computer (e.g., desktop, laptop, tablet, etc.), media computing platforms (e.g., cable and satellite set top boxes), handheld computing devices (e.g., PDAs), cell phones, or any other type of computing or communication platform.

Figure 5:
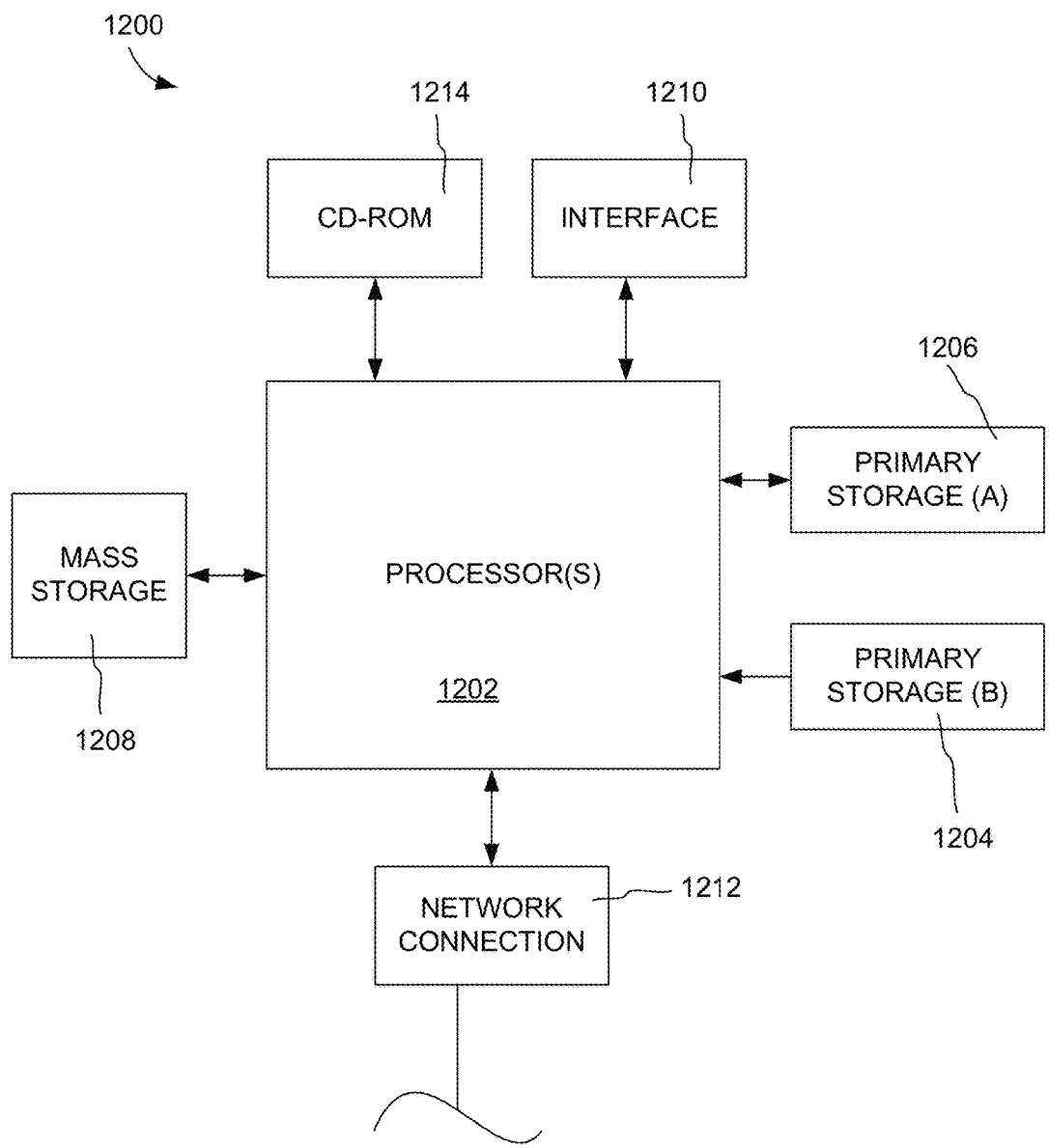
FIG. 5 is a schematic diagram illustrating an example computer system in which various embodiments may be implemented.

The disclosed embodiments may be implemented in some centralized manner. This is represented in FIG. 5 by server(s) 707, which may correspond to multiple distributed devices and data store(s). The server(s) 707 and/or corresponding data store(s) may store user account data, user information, and/or content.

Server

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Content Server

A content server may comprise a device that includes a configuration to provide content via a network to another device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example.

Examples of devices that may operate as a content server include desktop computers, multiprocessor systems, microprocessor-type or programmable consumer electronics, etc.

Client Device

FIG. 5 is a schematic diagram illustrating an example embodiment of a client device in which various embodiments may be implemented. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. A portable device may also be referred to as a mobile device or handheld device.

As shown in this example, a client device 800 may include one or more central processing units (CPUs) 822, which may be coupled via connection 824 to a power supply 826 and a memory 830. The memory 830 may include random access memory (RAM) 832 and read only memory (ROM) 834. The ROM 834 may include a basic input/output system (BIOS) 840.

The RAM 832 may include an operating system 841. More particularly, a client device may include or may execute a variety of operating systems, including a personal computer operating system, such as a Windows, iOS or Linux, or a mobile operating system, such as iOS, Android, or Windows Mobile, or the like. The client device 800 may also include or may execute a variety of possible applications 842 (shown in RAM 832), such as a client software application such as messenger 843, enabling communication with other devices, such as communicating one or more messages, such as via email, short message service (SMS), or multimedia message service (MMS), including via a network, such as a social network, including, for example, Facebook, LinkedIn, Twitter, Flickr, or Google, to provide only a few possible examples. The client device 800 may also include or execute an application to communicate content, such as, for example, textual content, multimedia content, or the like, which may be stored in data storage 844. A client device may also include or execute an application such as a browser 845 to perform a variety of possible tasks, such as browsing, searching, playing various forms of content, including locally stored or streamed video, or games (such as fantasy sports leagues).

The client device 800 may send or receive signals via one or more interface(s). As shown in this example, the client device 800 may include one or more network interfaces 850. The client device 800 may include an audio interface 852. In addition, the client device 800 may include a display 854 and an illuminator 858. The client device 800 may further include an Input/Output interface 860, as well as a Haptic Interface 862 supporting tactile feedback technology.

The client device 800 may vary in terms of capabilities or features. Claimed subject matter is intended to cover a wide range of potential variations. For example, a cell phone may include a keypad such 856 such as a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) 864 or other location identifying type capability, or a display with a high degree of functionality, such as a touch-sensitive color 2D or 3D display, for example. The foregoing is provided to illustrate that claimed subject matter is intended to include a wide range of possible features or capabilities.

According to various embodiments, input may be obtained using a wide variety of techniques. For example, input for downloading or launching an application may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input may be obtained in many other ways.

In some embodiments, an identity of the user (e.g., owner) of the client device may be statically configured. Thus, the device may be keyed to an owner or multiple owners. In other embodiments, the device may automatically determine the identity of the user of the device. For instance, a user of the device may be identified by deoxyribonucleic acid (DNA), retina scan, and/or finger print.

FIG. 6 illustrates a typical computer system that, when appropriately configured or designed, can serve as a system via which various embodiments may be implemented. The computer system 1200 includes any number of CPUs 1202 that are coupled to storage devices including primary storage 1206 (typically a RAM), primary storage 1204 (typically a ROM). CPU 1202 may be of various types including microcontrollers and microprocessors such as programmable devices (e.g., CPLDs and FPGAs) and unprogrammable devices such as gate array ASICs or general purpose microprocessors. As is well known in the art, primary storage 1204 acts to transfer data and instructions uni-directionally to the CPU and primary storage 1206 is used typically to transfer data and instructions in a bi-directional manner. Both of these primary storage devices may include any suitable computer-readable media such as those described above. A mass storage device 1208 is also coupled bi-directionally to CPU 1202 and provides additional data storage capacity and may include any of the computer-readable media described above. Mass storage device 1208 may be used to store programs, data and the like and is typically a secondary storage medium such as a hard disk. It will be appreciated that the information retained within the mass storage device 1208, may, in appropriate cases, be incorporated in standard fashion as part of primary storage 1206 as virtual memory. A specific mass storage device such as a CD-ROM 1214 may also pass data uni-directionally to the CPU.

CPU 1202 may also be coupled to an interface 1210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1202 optionally may be coupled to an external device such as a database or a computer or telecommunications network using an external connection as shown generally at 1212. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, graphical user interfaces to be displayed in association with the disclosed methods, etc.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as ROM and RAM. Examples of program instructions include both machine code, such as produced by a compiler, and files containing higher level code that may be executed by the computer using an interpreter.

Computer program instructions with which various embodiments are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques may be implemented in any suitable combination of software and/or hardware system, such as a web-based server or desktop computer system. Moreover, a system implementing various embodiments may be a portable device, such as a laptop or cell phone. An apparatus and/or web browser may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
    at a master node in a hierarchy of nodes, the master node having two or more child nodes, obtaining from the two or more child nodes two or more sets of data samples or summaries associated therewith, the two or more sets of data samples being representative of traffic processed via two or more sets of servers corresponding to the two or more child nodes, wherein a size of each of the two or more sets of data samples is proportional to an allocation of traffic among the two or more sets of servers corresponding to the two or more child nodes, wherein each of the two or more sets of data samples is obtained from a different one of the two or more child nodes and represents traffic processed by a corresponding one of the two or more sets of servers;
    at the master node, combining the two or more sets of data samples or summaries associated therewith such that a combined set of data is generated; and
    at the master node, ascertaining a numerical value from the combined set of data.

2. The method as recited in claim 1, wherein ascertaining a numerical value from the combined set of data comprises ascertaining an N-th percentile from the combined set of data.

3. The method as recited in claim 1, further comprising:
    transmitting, by the master node, a request to the two or more child nodes for data samples according to the allocation of the traffic among the two or more sets of servers corresponding to the two or more child nodes;
    wherein obtaining from the two or more child nodes two or more sets of data samples representative of traffic processed via the two or more sets of servers corresponding to the two or more child nodes includes receiving the two or more sets of data samples from the two or more child nodes in response to the request.

4. The method as recited in claim 1, further comprising:
    at the master node, ascertaining the allocation of traffic among the two or more sets of servers corresponding to the two or more child nodes.

5. The method as recited in claim 4, further comprising:
    at the master node, obtaining from the two or more child nodes, two or more total data counts representative of an amount of traffic processed via the two or more sets of servers corresponding to the two or more child nodes, wherein each of the two or more total data counts is obtained from a different one of the two or more child nodes;
    at the master node, ascertaining a total amount of traffic processed via the two or more sets of servers corresponding to the two or more child nodes based, at least in part, upon the two or more total data counts;
    wherein ascertaining the allocation of the traffic among the two or more sets of servers corresponding to the two or more child nodes is performed based, at least in part, upon the two or more total data counts.

6. The method as recited in claim 1, wherein the two or more child nodes are associated with one or more data centers, locations, operating systems, carriers, sources of content, time periods, types of media content, subject matter categories of content, or languages in which content is provided.

7. The method as recited in claim 1, wherein each of the two or more child nodes performs reservoir sampling to generate a corresponding one of the two or more sets of data samples.

8. The method as recited in claim 1, wherein the two or more sets of servers comprise the two or more child nodes, wherein each one of the two or more child nodes performs sampling of data representative of the traffic processed via the one of the two or more child nodes such that a set of data samples is obtained in association with the corresponding one of the two or more child nodes.

9. A non-transitory computer-readable storage medium storing thereon computer-readable instructions, comprising:
    instructions for obtaining, from each child node of a master node in a hierarchy of nodes, a set of data samples or summary associated therewith, the set of data samples being representative of traffic processed via a set of servers corresponding to the child node, wherein a size of the set of data samples is proportional to a distribution of total traffic among the set of servers and other sets of servers corresponding to other child nodes of the master node;
    instructions for generating, at the master node, a combined set of data from the set of data samples or summary obtained from each child node of the master node; and
    instructions for ascertaining, at the master node, a numerical value from the combined set of data.

10. The non-transitory computer-readable storage medium as recited in claim 9, wherein the numerical value comprises a sum, an N-th percentile, or an average.

11. The non-transitory computer-readable storage medium as recited in claim 9, further comprising:
    instructions for transmitting, by the master node, a request to the two or more child nodes for data samples according to the distribution of total traffic among the two or more sets of servers corresponding to the two or more child nodes;
    wherein obtaining from the two or more child nodes two or more sets of data samples representative of traffic processed via the two or more sets of servers corresponding to the two or more child nodes includes receiving the two or more sets of data samples from the two or more child nodes in response to the request.

12. The non-transitory computer-readable storage medium as recited in claim 11, further comprising:
    instructions for obtaining by the master node from the two or more child nodes, two or more total data counts representative of an amount of traffic processed via the two or more sets of servers corresponding to the two or more child nodes, wherein each of the two or more total data counts is obtained from a different one of the two or more child nodes;
    instructions for ascertaining, at the master node, a total amount of traffic processed via the two or more sets of servers corresponding to the two or more child nodes based, at least in part, upon the two or more total data counts;

wherein ascertaining the allocation of the traffic among the two or more sets of servers corresponding to the two or more child nodes is performed based, at least in part, upon the two or more total data counts.

13. The non-transitory computer-readable storage medium as recited in claim 9, further comprising:

instructions for obtaining, by the master node from each of the two or more child nodes, an N-th percentile of a corresponding segment of the traffic; and instructions for sending a notification or modifying operations of at least one server of the two or more sets of servers corresponding to the two or more child nodes, wherein sending a notification or modifying operations is performed by the master node based, at least in part, upon the N-th percentile received from each of the two or more child nodes.

14. An apparatus, comprising:

a processor; and a memory storing thereon computer-readable instructions, the computer-readable instructions being configured to:

at a master node in a hierarchy of nodes, the master node having two or more child nodes, obtain from the two or more child nodes two or more sets of data samples or summaries associated therewith, the two or more sets of data samples being representative of traffic processed via two or more sets of servers corresponding to the two or more child nodes, wherein a size of each of the two or more sets of data samples is proportional to an allocation of traffic among the two or more sets of servers corresponding to the two or more child nodes, wherein each of the two or more sets of data samples is obtained from a different one of the two or more child nodes and represents traffic processed by a corresponding one of the two or more sets of servers;

at the master node, combine the two or more sets of data samples or summaries associated therewith such that a combined set of data is generated; and at the master node, ascertain a numerical value from the combined set of data.

15. The apparatus as recited in claim 14, wherein the numerical value comprises an N-th percentile.

16. The apparatus as recited in claim 14, the computer-readable instructions being configured to performing operations, further comprising:

transmit, by the master node, a request to the two or more child nodes for data samples according to the allocation of the traffic among the two or more sets of servers corresponding to the two or more child nodes;

wherein obtaining from the two or more child nodes two or more sets of data samples representative of traffic processed via the two or more sets of servers corresponding to the two or more child nodes includes receiving the two or more sets of data samples from the two or more child nodes in response to the request.

17. The apparatus as recited in claim 14, the computer-readable instructions being configured to performing operations, further comprising:

ascertain, by the master node, for each one of the two or more child nodes, a number of data samples available from the corresponding one of the two or more child nodes; and transmit, by the master node, a request to the two or more child nodes for data samples according to the number of data samples available from each of the two or more child nodes and the allocation of the traffic among the two or more sets of servers corresponding to the two or more child nodes.

18. The apparatus as recited in claim 14, the computer-readable instructions being configured to performing operations, further comprising:

at the master node, obtain from the two or more child nodes, two or more total data counts representative of an amount of traffic processed via the two or more sets of servers corresponding to the two or more child nodes, wherein each of the two or more total data counts is obtained from a different one of the two or more child nodes;

at the master node, ascertain a total amount of traffic processed via the two or more sets of servers corresponding to the two or more child nodes based, at least in part, upon the two or more total data counts; and at the master node, ascertain the allocation of the traffic among the two or more sets of servers corresponding to the two or more child nodes is performed based, at least in part, upon the two or more total data counts.

19. The apparatus as recited in claim 14, wherein the two or more sets of data samples represent serving times experienced by clients receiving data from the two or more sets of servers corresponding to the two or more child nodes.

20. The apparatus as recited in claim 14, wherein the two or more sets of servers comprise the two or more child nodes, wherein each one of the two or more child nodes performs sampling of data representative of the traffic processed via the one of the two or more child nodes such that a set of data samples is obtained in association with the corresponding one of the two or more child nodes.

* * * * *